US008364746B2

(12) United States Patent
Annamalai et al.

(10) Patent No.: US 8,364,746 B2
(45) Date of Patent: Jan. 29, 2013

(54) SYSTEM AND METHOD FOR DETERMINING DEVICE LOCATION IN AN IP-BASED WIRELESS TELECOMMUNICATIONS NETWORK

(75) Inventors: Magesh Annamalai, Renton, WA (US); Zhengyi Jin, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 154 days.

(21) Appl. No.: 12/089,905

(22) PCT Filed: Oct. 20, 2006

(86) PCT No.: PCT/US2006/041226
§ 371 (c)(1),
(2), (4) Date: Feb. 9, 2009

(87) PCT Pub. No.: WO2007/048028
PCT Pub. Date: Apr. 26, 2007

(65) Prior Publication Data
US 2009/0177730 A1    Jul. 9, 2009

Related U.S. Application Data

(60) Provisional application No. 60/728,972, filed on Oct. 21, 2005.

(51) Int. Cl.
*G06F 15/16* (2006.01)
*G06F 15/177* (2006.01)
*H04M 11/04* (2006.01)
*H04M 3/42* (2006.01)
*H04W 36/00* (2009.01)
*H04W 24/00* (2009.01)

(52) U.S. Cl. ........ 709/202; 709/217; 709/220; 709/230; 709/245; 455/404.2; 455/414.2; 455/456.1; 455/440

(58) Field of Classification Search .................. 709/202, 709/217; 455/404.2, 414.2, 440, 456.1
See application file for complete search history.

(56) References Cited

U.S. PATENT DOCUMENTS

| 5,724,660 A | 3/1998 | Kauser et al. |
| 6,002,679 A | 12/1999 | Liu et al. |

(Continued)

FOREIGN PATENT DOCUMENTS

| EP | 2051556 A1 | 4/2009 |
| JP | 10239416 | 9/1998 |

OTHER PUBLICATIONS

"Enabler Release Definition for Secure UserPlane for Location," Candidate Version 1.0, Open Mobile Alliance, Jan. 22, 2007, 17 pages.

(Continued)

*Primary Examiner* — Ranodhi Serrao
*Assistant Examiner* — Farrukh Hussain

(57) ABSTRACT

A system and method determines a geographic position of a mobile device in communication with an IP-based wireless telecommunications network. A wireless connection between the mobile device and the IP-based wireless telecommunications network is established when the mobile device registers with a network controller (NC) through an access point (AP). When a geographical position is needed for the mobile device (e.g., a 911 call), messages are exchanged between the NC and the SMLC, where the SMLC retrieves information from a database that is used to identify the geographic position of the mobile device. The database can store a variety of information related to mobile devices such as: last known position, IP address, MAC address, device or subscriber identifier, last CGI, etc. The geographical position is communicated back to the NC, which can then forward the position information to a switch for processing such as for 911 calls.

31 Claims, 9 Drawing Sheets

U.S. PATENT DOCUMENTS

| | | | |
|---|---|---|---|
| 6,104,712 | A | 8/2000 | Robert et al. |
| 6,119,012 | A * | 9/2000 | Amirijoo .................. 455/456.1 |
| 6,222,483 | B1 | 4/2001 | Twitchell et al. |
| 6,665,611 | B1 | 12/2003 | Oran et al. |
| 6,690,659 | B1 | 2/2004 | Ahmed et al. |
| 6,801,778 | B2 | 10/2004 | Koorapaty et al. |
| 7,151,941 | B2 | 12/2006 | Vanttinen et al. |
| 7,177,399 | B2 | 2/2007 | Dawson et al. |
| 7,194,354 | B1 | 3/2007 | Oran et al. |
| 7,245,900 | B1 | 7/2007 | Lamb et al. |
| 7,272,500 | B1 | 9/2007 | Walker |
| 7,283,822 | B2 | 10/2007 | Gallagher et al. |
| 7,317,910 | B2 | 1/2008 | Niemenmaa et al. |
| 7,336,962 | B2 | 2/2008 | Levitan |
| 7,353,034 | B2 | 4/2008 | Haney |
| 7,369,859 | B2 | 5/2008 | Gallagher |
| 7,433,673 | B1 | 10/2008 | Everson et al. |
| 7,436,789 | B2 | 10/2008 | Caliskan et al. |
| 7,606,555 | B2 | 10/2009 | Walsh et al. |
| 7,610,011 | B2 | 10/2009 | Albrett |
| 7,676,394 | B2 | 3/2010 | Ramer et al. |
| 7,714,778 | B2 | 5/2010 | Dupray |
| 7,903,029 | B2 | 3/2011 | Dupray |
| 7,904,096 | B2 | 3/2011 | Shyr et al. |
| 8,116,291 | B2 | 2/2012 | Annamalai et al. |
| 8,145,183 | B2 | 3/2012 | Barbeau et al. |
| 2002/0064141 | A1 | 5/2002 | Sakakura |
| 2002/0123354 | A1 | 9/2002 | Nowak |
| 2003/0016648 | A1 | 1/2003 | Lindsay et al. |
| 2003/0139182 | A1 | 7/2003 | Bakkeby et al. |
| 2003/0216143 | A1 | 11/2003 | Roese et al. |
| 2004/0087315 | A1 | 5/2004 | Dufva et al. |
| 2004/0102196 | A1 | 5/2004 | Weckstrom et al. |
| 2004/0157590 | A1 * | 8/2004 | Lazaridis et al. .............. 455/415 |
| 2004/0166856 | A1 | 8/2004 | Niemenmaa |
| 2004/0198386 | A1 | 10/2004 | Dupray |
| 2004/0202120 | A1 | 10/2004 | Hanson |
| 2004/0203853 | A1 | 10/2004 | Sheynblat |
| 2004/0203915 | A1 | 10/2004 | van Diggelen et al. |
| 2004/0224702 | A1 * | 11/2004 | Chaskar .................... 455/456.3 |
| 2005/0003831 | A1 | 1/2005 | Anderson |
| 2005/0059415 | A1 | 3/2005 | Easo et al. |
| 2005/0066044 | A1 | 3/2005 | Chaskar et al. |
| 2005/0070306 | A1 | 3/2005 | Kim et al. |
| 2005/0130673 | A1 | 6/2005 | Annamalai |
| 2005/0138144 | A1 | 6/2005 | Sethi |
| 2005/0148342 | A1 | 7/2005 | Sylvain |
| 2005/0153687 | A1 | 7/2005 | Niemenmaa et al. |
| 2005/0170851 | A1 | 8/2005 | Melpignano et al. |
| 2005/0192024 | A1 | 9/2005 | Sheynblat |
| 2005/0286466 | A1 | 12/2005 | Tagg et al. |
| 2006/0009235 | A1 | 1/2006 | Sheynblat et al. |
| 2006/0014548 | A1 | 1/2006 | Bolin et al. |
| 2006/0015513 | A1 | 1/2006 | Poyhonen et al. |
| 2006/0025158 | A1 * | 2/2006 | Leblanc et al. ............ 455/456.2 |
| 2006/0062363 | A1 | 3/2006 | Albrett |
| 2006/0172732 | A1 | 8/2006 | Nylander et al. |
| 2006/0194594 | A1 | 8/2006 | Ruutu et al. |
| 2006/0258365 | A1 | 11/2006 | Cha et al. |
| 2006/0276201 | A1 | 12/2006 | Dupray |
| 2006/0286984 | A1 | 12/2006 | Bonner |
| 2007/0060114 | A1 | 3/2007 | Ramer et al. |
| 2007/0061198 | A1 | 3/2007 | Ramer et al. |
| 2007/0061242 | A1 | 3/2007 | Ramer et al. |
| 2007/0061243 | A1 | 3/2007 | Ramer et al. |
| 2007/0061244 | A1 | 3/2007 | Ramer et al. |
| 2007/0061245 | A1 | 3/2007 | Ramer et al. |
| 2007/0061246 | A1 | 3/2007 | Ramer et al. |
| 2007/0061247 | A1 | 3/2007 | Ramer et al. |
| 2007/0061303 | A1 | 3/2007 | Ramer et al. |
| 2007/0061317 | A1 | 3/2007 | Ramer et al. |
| 2007/0072624 | A1 | 3/2007 | Niemenmaa et al. |
| 2007/0073717 | A1 | 3/2007 | Ramer et al. |
| 2007/0073718 | A1 | 3/2007 | Ramer et al. |
| 2007/0073719 | A1 | 3/2007 | Ramer et al. |
| 2007/0073722 | A1 | 3/2007 | Ramer et al. |
| 2007/0073723 | A1 | 3/2007 | Ramer et al. |
| 2007/0123237 | A1 * | 5/2007 | Cacioppo et al. .......... 455/414.4 |
| 2007/0178913 | A1 | 8/2007 | Niemenmaa et al. |
| 2007/0192294 | A1 | 8/2007 | Ramer et al. |
| 2007/0192318 | A1 | 8/2007 | Ramer et al. |
| 2007/0198485 | A1 | 8/2007 | Ramer et al. |
| 2007/0239724 | A1 | 10/2007 | Ramer et al. |
| 2007/0288427 | A1 | 12/2007 | Ramer et al. |
| 2008/0009268 | A1 | 1/2008 | Ramer et al. |
| 2008/0045236 | A1 | 2/2008 | Nahon et al. |
| 2008/0081620 | A1 | 4/2008 | Lu et al. |
| 2008/0108319 | A1 | 5/2008 | Gallagher |
| 2008/0192696 | A1 * | 8/2008 | Sachs et al. .................. 370/331 |
| 2008/0280624 | A1 | 11/2008 | Wrappe |
| 2009/0185669 | A1 * | 7/2009 | Zitnik et al. ............. 379/217.01 |
| 2009/0275348 | A1 | 11/2009 | Weinreich et al. |
| 2009/0311987 | A1 | 12/2009 | Edge et al. |
| 2010/0046406 | A1 | 2/2010 | Annamalai et al. |
| 2010/0069099 | A1 | 3/2010 | Dunn et al. |
| 2010/0289640 | A1 | 11/2010 | Annamalai |
| 2010/0291947 | A1 | 11/2010 | Annamalai |
| 2011/0039576 | A1 | 2/2011 | Prakash et al. |
| 2011/0047033 | A1 | 2/2011 | Mahaffey et al. |
| 2011/0051658 | A1 | 3/2011 | Jin et al. |
| 2011/0051665 | A1 | 3/2011 | Huang |
| 2011/0200022 | A1 | 8/2011 | Annamalai |

OTHER PUBLICATIONS

"IP Multimedia Subsystem," Wikipedia, http://wikipedia.org/wiki/IP_Multimedia_Subsystem, [Last Accessed May 5, 2010], 13 pages.

"Secure User Plane for Location Requirements," Candidate Version 1.0, Open Mobile Alliance, Jun. 16, 2005, 26 pages.

"Secure UserPlane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence-Dual Mode Handsets," UMA Universal Mobile Access, UMA Today, 2007, 2 pages.

"The 3GPP Standard for Convergence-Femtocells," UMA Universal Mobile Access, UMA Today, 2007, 2 pages.

"The 3GPP Standard for Convergence-Softmobiles," UMA Universal Mobile Access, UMA Today, 2007, 2 pages.

"The 3GPP Standard for Convergence-Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Dyoub, J. et al., "Dueling Architectures: Control plane vs. Userplane," HP invent, 2004, 2 pages.

Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Applicaiton No. PCT/US2007/82133, Applicant: T-Mobile USA, Inc., Flied on Oct. 22, 2007, Date Mailed on Apr. 29, 2008, 9 pages.

International Search Report and Written Opinion, International Application No. PCT/2006/41226, Filed on Oct. 20, 2006, Appliant: T-Mobile USA, Inc., Date of Mailing: Dec. 4, 2007, 18 pages.

International Search Report and Written Opinion, International Application No. PCT/2007/82156, Filed on Oct. 22, 2007, Applicant: T-Mobile USA, Inc., Date of Mailing: May 28, 2008, 12 pages.

International Search Report and Written Opinion, International Application No. PCT/US2007/66579, Filed on Apr. 12, 2007, Applicant: T-Mobile, Inc., Date of Mailing Sep. 9, 2008, 9 pages.

International Search Report and Written Opinion, International Application No. PCT/US2007/82136, Applicant: T-Mobile USA, Inc., Flied on Oct. 22, 2007, Date Mailed on Mar. 11, 2008, 11 pages.

Raja, K., et al., "We Know," IEE Communication Engineer, Jun./Jul. 2004, 6 pages.

Spinney, Jonathan, "Wireless Location Uses in the User Plane and Control Plane," The Location Based Services Community, Jun. 27, 2005, 3 pages.

U.S. Appl. No. 13/154,365, filed Jun. 6, 2011, Caldwell et al.

International Search Report and Written Opinion, International Application No. PCT/US2010/035010, Applicant: T-Mobile USA, Inc., Flied on May 14, 2010, Date Mailed on Dec. 22, 2010, 10 pages.

International Search Report and Written Opinion, International Application No. PCT/US2010/035014, Applicant: T-Mobile USA, Inc., Flied on May 14, 2010, Date Mailed on Dec. 28, 2010, 11 pages.

Martin-Escalona, et al., "Delivery of Non-Standardized Assistance Data in E-OTD/GNSS Hybrid Location Systems," IEEE 2002, pp. 1-5.

Steinfield, "The Development of Location Based Services in Mobile Commerce," Elife after the dot.com bust, Berlin, Springer, 2004, pp. 1-15.

* cited by examiner

Signalling Protocols between SMLC, Switch and NC

SYSTEM AND METHOD FOR DETERMINING DEVICE LOCATION IN AN IP-BASED WIRELESS TELECOMMUNICATIONS NETWORK

RELATED APPLICATIONS

This utility patent application is a U.S. National Stage application of International Application No. PCT/US06/41226, entitled "SYSTEM AND METHOD FOR DETERMINING DEVICE LOCATION IN AN IP-BASED WIRELESS TELECOMMUNICATIONS NETWORK," filed Oct. 20, 2006, which claims the benefit under 35 United States Code §119(e) of U.S. Provisional Patent Application No. 60/728,972, which was filed Oct. 21, 2005.

FIELD OF THE INVENTION

The present invention relates to determination of a mobile device's location in an IP-based wireless telecommunications network. More specifically, the present invention is related to systems and methods for determining a geographical location of a mobile device by retrieving information related to the mobile device from a database, processing the retrieved information to identify a position, and communicating the position information to a switch for further handling.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

The present disclosure has identified a number of problems in locating a mobile device on an IP-based wireless telecommunications network and providing location based services to the mobile device. Telecommunications service, providers would like to offer location-based services that deliver information specific to the mobile device's current location. Telecommunications service providers also wish to route certain calls, such as 911 or "emergency" calls, to an office that is geographically relevant to the user of a mobile device. The present disclosure has identified the above and other needs for service providers who operate IP-based wireless telecommunications networks to implement systems and methods that determine the mobile device's location on an IP-based wireless telecommunications network.

BRIEF DESCRIPTION OF THE DRAWINGS

Non-limiting and non-exhaustive embodiments are described with reference to the following drawings.

DETAILED DESCRIPTION

Figure 1:
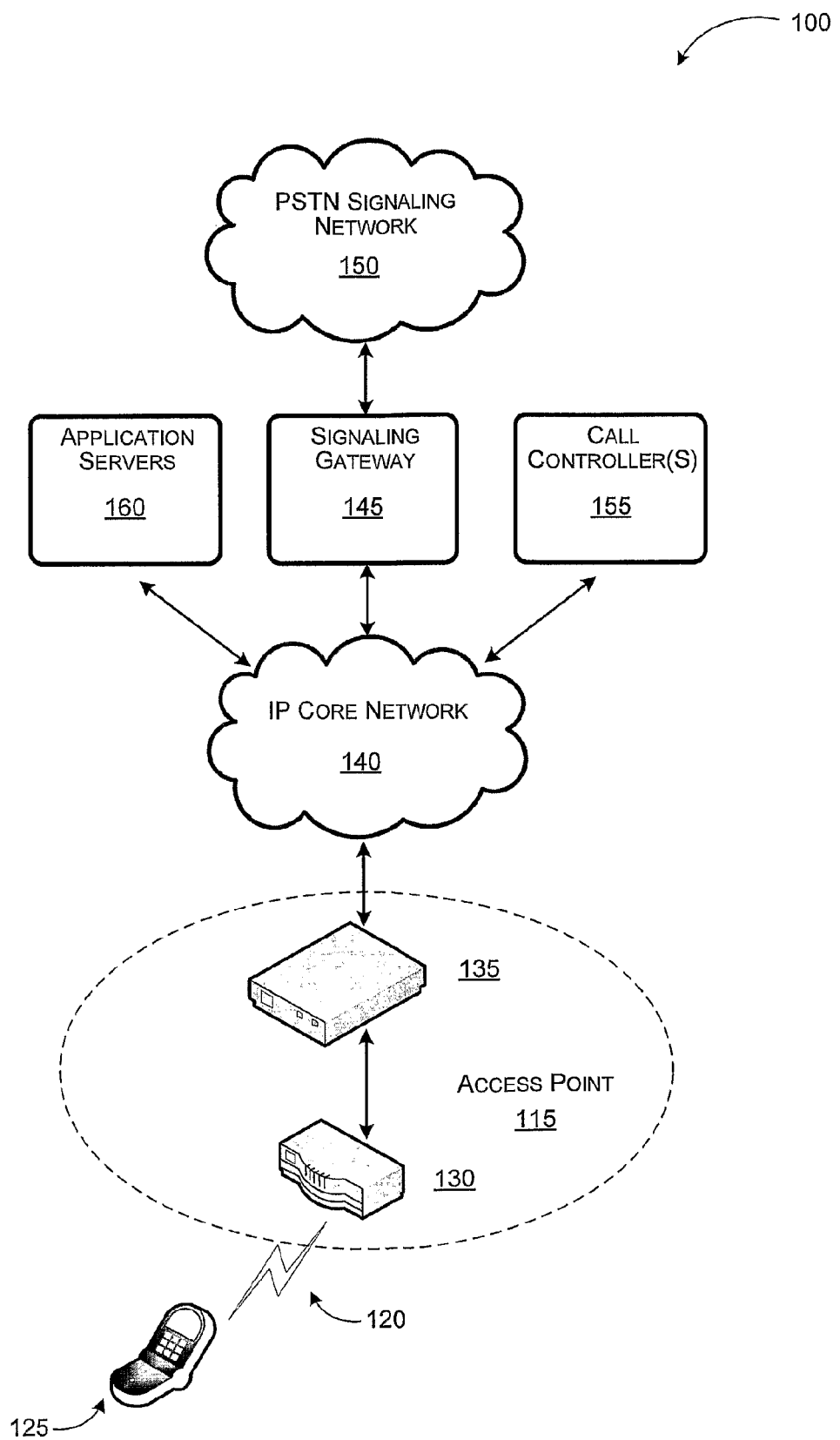
FIG. 1 illustrates an example Voice over IP system.

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Briefly stated, the present disclosure relates to a system and method for locating the geographic position of a mobile device when in communication with an IP-based wireless telecommunications network. A wireless connection between the mobile device and the IP-based wireless telecommunications network is established when the mobile device registers with a network controller (NC) through an access point (AP). When a geographical position is needed for the mobile device (e.g., a 911 call), messages are exchanged between the NC and the SMLC, where the SMLC retrieves information from a database that is used to identify the geographic position of the mobile device. The database can store a variety of information related to mobile devices such as: last known position, IP address, MAC address, a mobile or subscriber identifier (such as an International Mobile Subscriber Identity (IMSI)), last CGI, etc. The geographical position is communicated back to the NC, which can then forward the position information to a switch for processing such as for 911 calls.

Example IP-based wireless communication networks include VoIP networks and/or converged wireless networks that include a combination of cellular networks and IP-based wireless telecommunications network (e.g., unlicensed mobile access or UMA network technologies). A mobile device can access a VoIP network via a wireless connection with an access point. A dual-mode wireless telecommunication device can access either a cellular network or an IP-based wireless telecommunications network, such as a UMA network, thereby allowing mobile devices to roam voice, data and multimedia communications between conventional cellular networks and wireless local area network access points at home, in the office and at public areas (e.g., hot spots). Calls are transferred between the networks depending on whether the access point is in range or not, permitting users to transparently connect to the fastest or lowest cost network.

The positioning system may be useful when the mobile subscriber issues a 911 emergency call or when a mobile subscriber wishes to receive value added location based services (such as information regarding nearby restaurants, gas stations, entertainment complexes and similar locations of interest). In the case of emergency services the call is routed to a public safety answering point (PSAP) and is forwarded to the proper services. The PSAP receives the caller's phone number and the exact geographic location of the mobile device from which the call was made.

Example VoIP and IP-Based Wireless Telecommunications Networks

FIG. 1 illustrates the components of a generalized Voice over Internet Protocol (VoIP) system 100 for mobile communication devices. The system comprises one or more access points (APs) 115 that can accept communications 120 from mobile devices 125. The access point includes a wireless router 130 and a broadband modem 135 that enable connection to an Internet Protocol (IP) network 140. IP network 140 may be one or more public networks, private networks, or combination of public and private networks. IP packets that carry communications from the mobile device 125 are received at the access point 115 and transported through the IP network 140 to a signaling gateway 145. Signaling gateway 145 can typically be operated by a service provider and converts the VoIP signal to a traditional phone service signal. The phone signal is then conveyed to the intended recipient via a public switched telephone network (PSTN) 150. A call controller 155 that is located in the service provider's network provides call logic and call control functions. An application server 160 that is located in the service provider's network provides logic and execution of one or more applications or services that are offered by the server provider, such as implementing various access and security rules.

The VoIP system depicted in FIG. 1 is an architecture that broadly enables a mobile device to receive IP-formatted telecommunication services. One example application of the described technology is for an Unlicensed Mobile Access (UMA) network that allows cellular service providers to offer their products and services seamlessly over Internet-connected broadband networks. Mobile devices may utilize licensed spectrums (such as spectrums for cellular communications) and alternate licensed, semilicensed and unlicensed spectrums (such as spectrums for IP-based wireless communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks are accessed via wireless access points that are typically connected to a DSL (Digital Subscriber Line) modem, a cable modem, a satellite modem, or any other broadband Internet connection. The access points may be public or private, and may be located in a subscriber's home, in other apartments or residences, in public locations such as coffee shops, libraries, or schools, or in corporate locations.

When a mobile device accesses an IP-based wireless network, information is initially formatted in the cellular system's native protocol and then encapsulated into Internet Protocol (IP) packets, transmitted to the access point, and communicated over the Internet to the cellular service provider's mobile core network. Such transmissions bypass the service provider's existing network of radio towers. Because the same cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed and/or unlicensed spectrum access).

A non-exhaustive list of products and services available on IP-based wireless telecommunications networks includes not only voice services, but also supplementary services like call forwarding and call waiting, text messaging services like SMS, and data-based services like ringtone downloads, game downloads, picture messaging, email and web browsing. Further, since a mobile device is connected to an IP network, a wide variety of data services available over such networks may be provided to the mobile device.

Figure 2A:
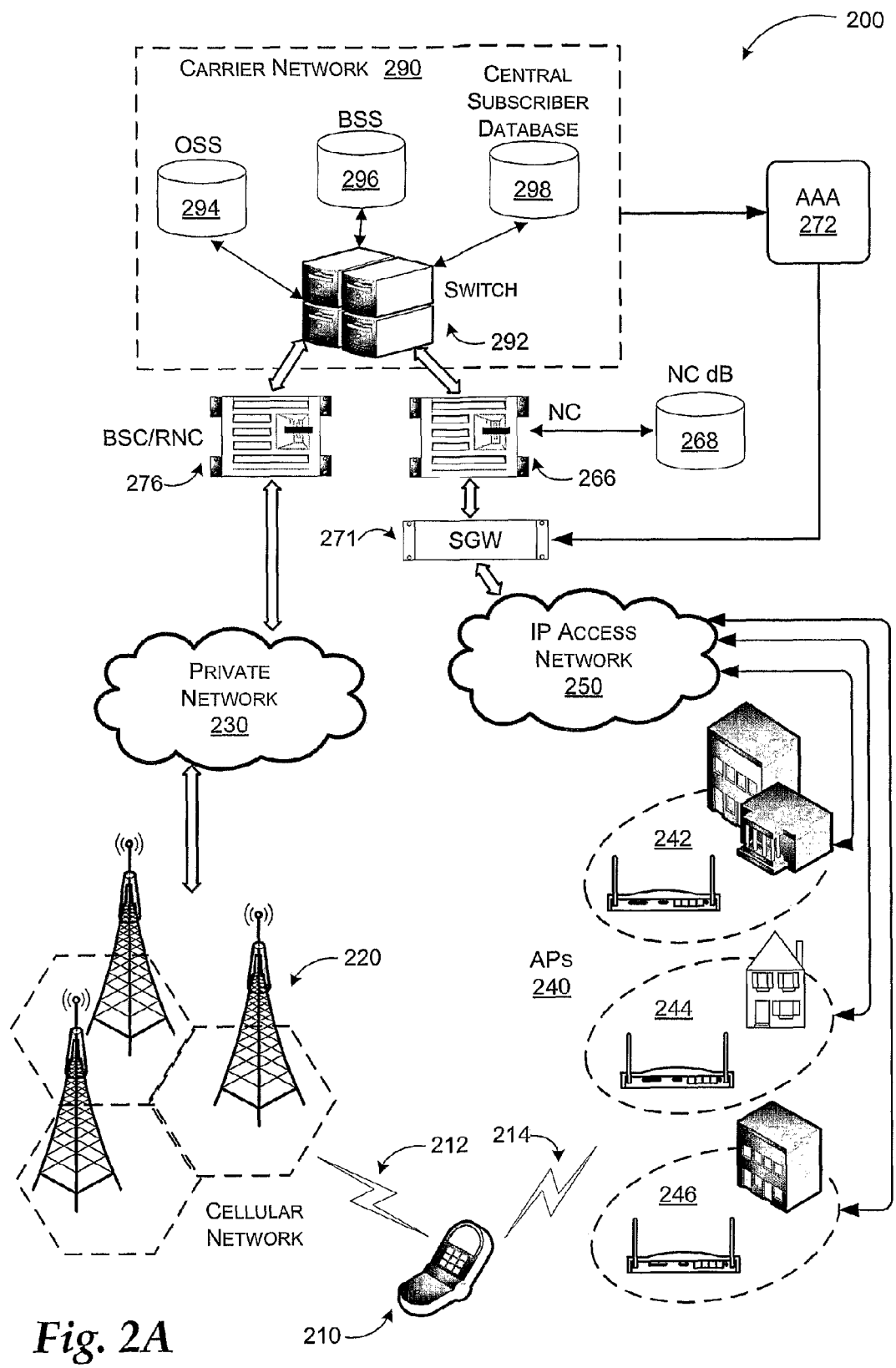
FIG. 2A illustrates an example converged wireless network combining a cellular network with an IP-based access network.

FIG. 2A is an illustration of a system 200 that combines a cellular telephone network with an IP-based wireless telecommunications network. The described system 200 accepts registration requests and call connections from a mobile device 210 to either a cellular telephone network or to an IP-based wireless network.

The example cellular telephone network includes one or more cell towers 220 that are configured to accept cellular communications 212 from mobile device 210. The cell towers 220 are connected to a controller (such as a base station controller/radio network controller (BSC/RNC)) 276 via a private network 230. The private network 230 can include a variety of connections such as T1 lines, a wide area network (WAN), a local area network (LAN), various network switches, and other similar components. Cell tower controller 276 controls network communication traffic to the carrier network 290, where all communications are managed. An example carrier network 290 includes a switch (such as a mobile switching center (MSC)) 292, which is configured to control data/call flows, perform load balancing, as well as other functions. A variety of system databases may also be accessed in the carrier network such as, e.g., an operation support subsystem (OSS) database 294, a business support system (BSS) database 296, and a central subscriber database that contains details of a carriers' subscribers (such as a home location register (HLR)) 298, for billing, call logging, etc.

The example IP-based wireless network includes one or more access points (APs) 240 that can accept IP communications 214 from mobile device 210. An access point can be configured as part of a wireless network in one or more locations such as a public network 242, a home network 244, or a private business network 246. Each access point is coupled to an Internet Protocol (IP) network 250 through a broadband connection. IP packets that carry communications (data, voice, SMS, etc.) are routed from the access points to a security gateway (SGW) 271 through the IP network 250. The security gateway controls access to the network controller (such as a UMA Network Controller (UNC)) 266, which communicates with a database 268 for logging and/or accessing various data associated with communications. The network controller 266 is also configured to manage access with the carrier network 290 in a similar manner to that performed by the BSC/RNC 276.

Authentication of a request for access by a mobile device over the IP-based network is handled by the security gateway 271, which communicates with an authentication, accounting and authorization (AAA) module 272 as shown in FIG. 2A. Challenges and responses to requests for access by the mobile device are communicated between a central subscriber database 298 and the AAA module 272. When authorization is granted, the security gateway 271 communicates the assignment of an IP address to the mobile device 210 that requested access. Once the IP address is passed to the mobile device 210 by the security gateway 271, the public IP address assigned to the device is passed to the network controller 266.

Figure 2B:
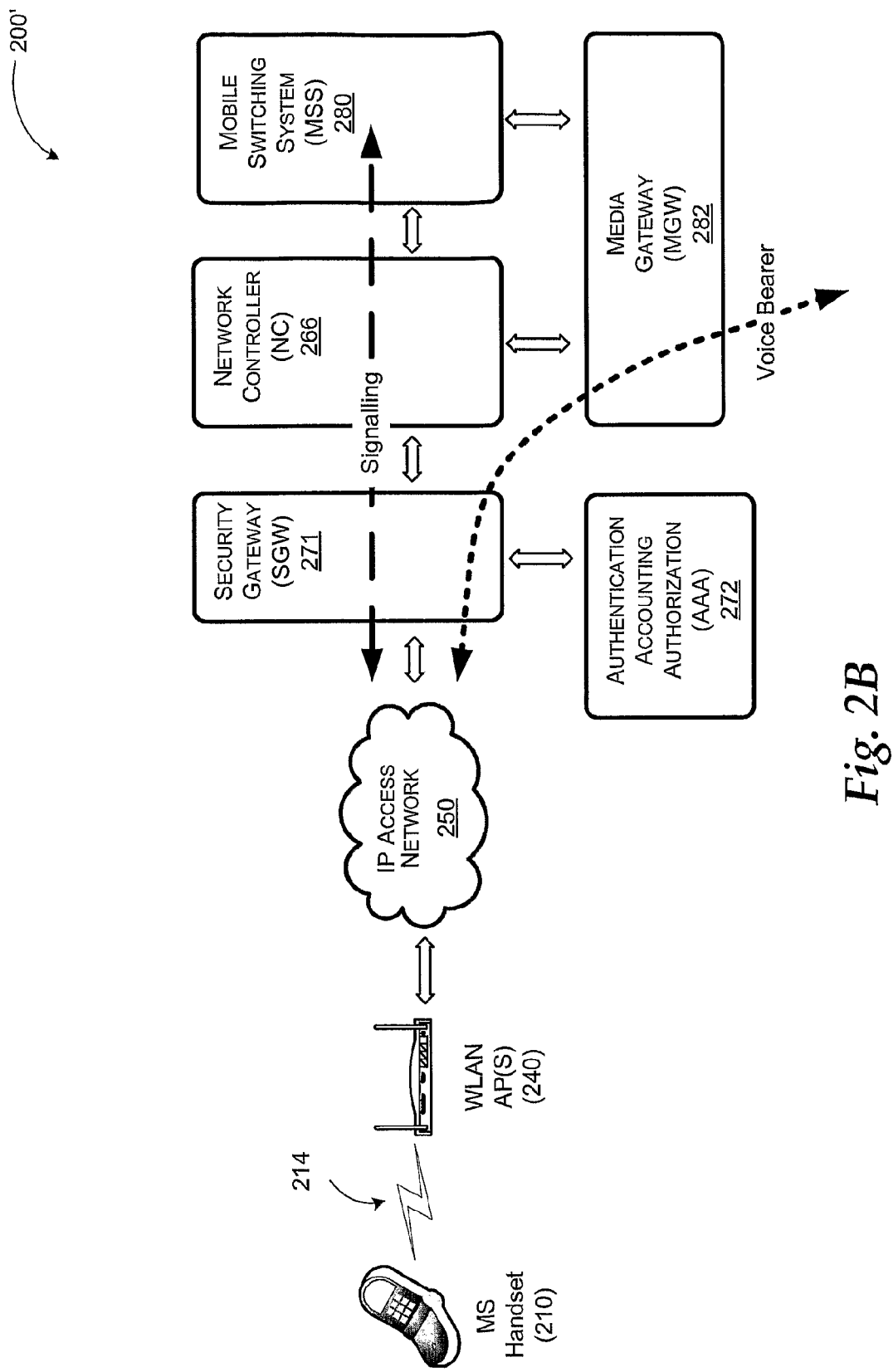
FIG. 2B illustrates another example converged wireless network combining a cellular network with an IP-based network.

FIG. 2B illustrates another example system that combines a cellular telephone network with an IP-based network (in this case, a UMA network). The described system 200' accepts registration requests and call connections from a mobile device 210 to either a cellular telephone network (not shown) or to an IP-based wireless network. The system 200' includes one or more access points (AP) 240 that accept communications 214 from mobile device 210. Each access point is coupled to an IP network 250 through a broadband connection. IP network 250 routes communications (data, voice, SMS, etc.) between the access points and a security gateway (SGW) 271. The security gateway 271 controls access to the network controller 266, which communicates with a database (not shown) for logging and accessing various data associated with communications. Authentication, accounting, and authorization are handled by SGW 271 via AAA module 272, as previously described.

For the example system 200', the signaling path of an IP-based call is routed through the network controller 266 to a mobile switching system (MSS) 280, while the voice bearer path is routed through the network controller 266 to a media gateway (MGW) 282. The signaling portion of a communication governs various overhead aspects of the communication such as, for example, when the call starts, when the call stops, initiating a telephone ring, etc. The voice bearer portion of the communication contains the actual content (either data or voice information) of the communication. The MGW 282 controls the content flow between the service provider and the mobile device 210, while the MSS 280 controls the signaling flow (or controls overhead-related flow) between the service provider and the mobile device 210.

Figure 3:
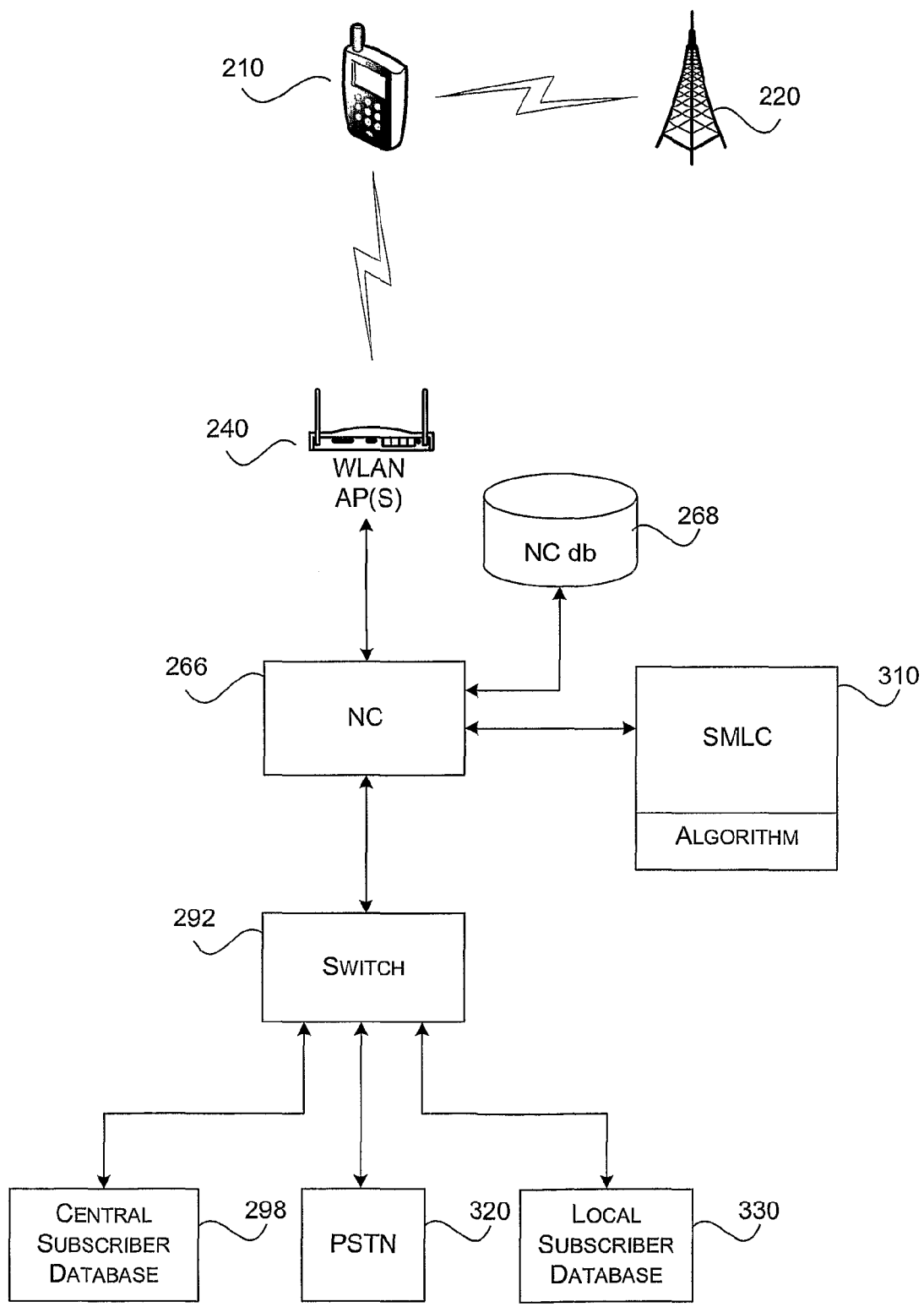
FIG. 3 illustrates a positioning system for locating the geographic position of a mobile device in either a wireless VoIP network or a converged cellular network and IP-based wireless telecommunications network.

FIG. 3 illustrates a positioning system for locating the geographic position of a mobile device in either a wireless VoIP network or a converged cellular network and IP-based wireless telecommunications network (in this case, a UMA network). The system includes a mobile device 210, one or more access points 240, a network controller (NC) 266, a data store such as an NC database 268, a serving mobile location center (SMLC) 310, and a switch 292. Switch 292 may access a central subscriber database 298, a public switched telephone network (PSTN) 320, and a local subscriber database 330. In one embodiment, mobile device 210 is a dual-mode unit capable of communicating on a cellular network via cell tower 220 and an IP-based wireless telecommunications network via access point 240. SMLC 310 includes a location algorithm for different access networks. NC database 268 may be internal or external relative to NC 266. NC database 268 may serve more than one NC 266.

The present disclosure is directed to an interface and a corresponding protocol between NC 266 and SMLC 310. In one example, a mobile subscriber issues a call from mobile device 210. The call is routed to switch 292 via access point 240 and NC 266. A series of messages are executed sequentially to locate the geographic position of mobile device 210. A perform location request (PLRQ) message is sent from NC 266 to SMLC 310. SMLC 310 sends a positioning request to be retrieved from NC database 268. The NC database 268 provides location information associated with at least one of: a media access control (MAC) address associated with an access point, an identifier associated with mobile device 210, a cell global identity (CGI) associated with mobile device when the call is made, an internet protocol (IP) address associated with the access point, or any other combination thereof. SMLC 310 executes an algorithm to calculate the geographic position of mobile device 210 using the location information retrieved from NC database 268. The calculated position is returned to NC 266 via a perform location response (PLRS) message. NC 266 forwards the calculated location result to switch 292 via the PLRS.

Figure 4:
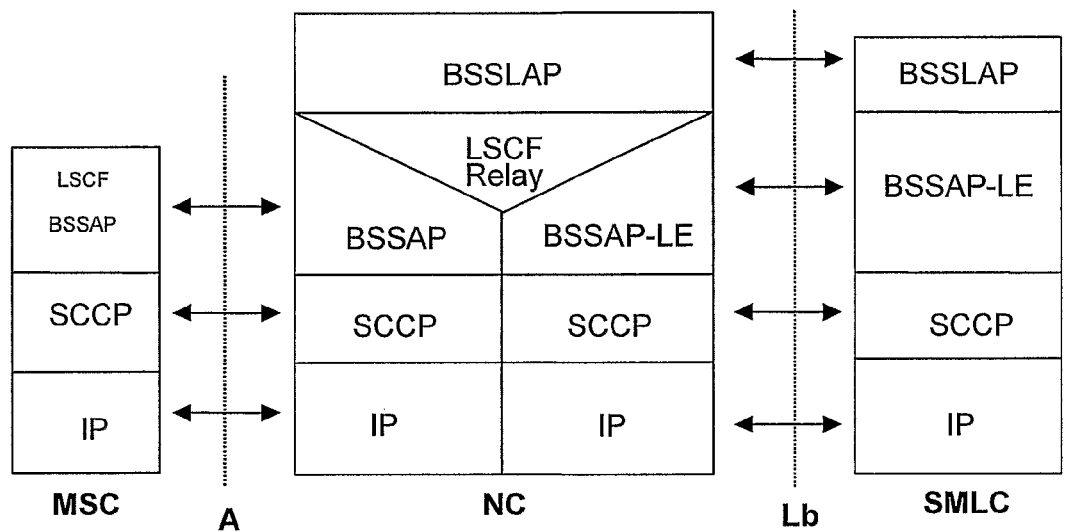
FIG. 4 is a functional block diagram that illustrates signaling protocols between a network controller and a serving mobile location center in an IP-based wireless telecommunications network.

FIG. 4 is a functional block diagram that illustrates signaling protocols between the SMLC, switch and NC. Each component includes an IP transport part, a signaling connection control part (SCCP), and a base station subsystem application part (BSSAP). The switch includes a location system control function (LSCF). The switch communicates with the NC through an interface (A). The SMLC communicates with the NC through a different interface (Lb).

The different pre-standard Lb interface messages and the parameters to support the NC-SMLC Lb interface and the NC database interface messages related to positioning are described in detail below. In each table the presence of specific data is qualified, where M=mandatory, C=conditional, and O=optional. An information element identified as conditional means that the element may be included in the message if the optional element located above it is included. For example, referring to Table 2, Location Estimate 1 may be included if mobile device or subscriber identifier is included.

Positioning Request

Positioning Request is a message that is sent from the SMLC to the NC. The Positioning Request message requests that the NC return the specific control information. The Positioning Request message contains the following information elements.

TABLE 1

Positioning Request message content

| Information element | Presence | NC Support | SMLC support |
|---|---|---|---|
| Message Type | M | | |

Positioning Response

Positioning Response is a message that is sent from the NC to the SMLC. The Positioning Response message is a response to the positioning request message. The Positioning Response message contains the following information elements.

TABLE 2

Positioning Response message content

| Information element | Presence | NC Support | SMLC support |
|---|---|---|---|
| Message Type | M | | |
| NC Control Channel Description | M | | |
| Device Identifier/IMSI | O | | |
| Location Estimate1 | C | | |
| UnCertanity1 | C | | |
| Positioning Data1 | C | | |
| AP Radio Identifier (MAC address) | O | | |
| Location Estimate2 | C | | |
| UnCertanity2 | C | | |
| Positioning Data2 | C | | |
| IP address of AP | O | | |
| UnCertanity3 | C | | |
| Location Estimate3 | C | | |
| Positioning Data3 | C | | |
| Cellular coverage indication | M | | |
| Cellular CGI | O | | |
| IP-based CGI | O | | |

Reset

Reset is a message that is sent from the NC to the SMLC. The Reset message is sent when the response message contents for a positioning request are invalidated before the positioning procedure was completed. The following are expected cause values for the reset message: failure for other radio related events; supervision timer expired; incorrect serving cell identity; and handover. The Reset message contains the following information elements.

TABLE 3

Reset message content

| Information element | Presence | NC Support | SMLC support |
|---|---|---|---|
| Message Type | M | | |
| Cell ID | M | | |
| NC Control Channel description | M | | |
| Cause | M | | |
| Location Area Code (LAC) | O | | |

Reject

Reject is a message that is sent from the NC to the SMLC. The Reject message is a possible response to the positioning request. The following are expected cause values for the Reject message: congestion; channel mode not supported; positioning procedure not supported; failure for other radio related events; incorrect serving cell identity; and segmentation error. The Reject message contains the following information elements.

TABLE 4

Reject message content

| Information element | Presence | NC Support | SMLC support |
|---|---|---|---|
| Message Type | M | | |
| Cause | M | | |

Abort

Abort is a message that is sent either from the NC to the SMLC, or from the SMLC to the NC. Upon receiving the Abort message, the SMLC or NC aborts the ongoing positioning procedure. The following are expected cause values for the Abort message: failure for other radio related events; supervision timer expired; and loss of signaling connection to MS. The Abort message contains the following information elements.

TABLE 5

Abort message content

| Information element | Presence | NC Support | SMLC support |
|---|---|---|---|
| Message Type | M | | |
| Cause | M | | |

DB Location Request

DB Location Request is a message that is sent from the NC to the NC database. The DB Location Request message requests that the NC database return a location estimation. The DB Location Request message contains the following information elements.

TABLE 6

Data Base Location Request message content

| Information element | Presence | NC Support | NC DB support |
|---|---|---|---|
| Message Type | M | | |
| Device Identifier/IMSI | O | | |
| AP Radio identifier (MAC address) | O | | |
| IP address of AP | O | | |

DB Location Response

DB Location Response is a message that is sent from the NC database to the NC. The DB Location Response message contains the following information elements.

TABLE 7

DB Location Response message content

| Information element | Presence | NC Support | NC DB support |
|---|---|---|---|
| Message Type | M | | |
| Device Identifier/IMSI | O | | |
| Location Estimate1 | C | | |
| UnCertanity1 | C | | |
| Positioning Data1 | C | | |
| AP Radio Identifier (MAC address) | O | | |
| Location Estimate2 | C | | |
| UnCertanity2 | C | | |
| Positioning Data2 | C | | |
| IP address of AP | O | | |
| UnCertanity3 | C | | |
| Location Estimate3 | C | | |
| Positioning Data3 | C | | |
| Cellular CGI | O | | |
| IP-based CGI | O | | |

NC Database Abort

NC Database Abort is a message that is sent either from the NC database to the NC, or from the NC to the NC database. The NC Database Abort message contains the following information elements.

TABLE 7

NC Database Abort message content

| Information element | Presence | NC Support | NC DB Support |
|---|---|---|---|
| Message type | M | | |
| Transaction_ID | M | | |
| Cause | M | | |

Figure 5:
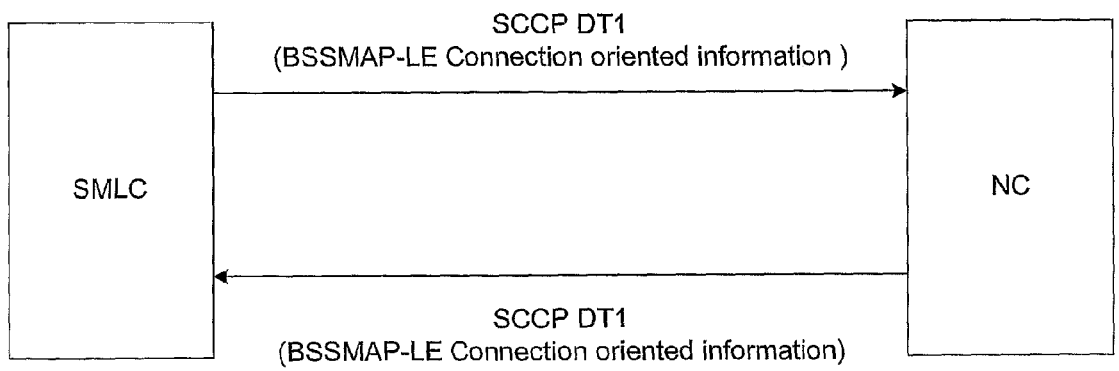
FIG. 5 is a functional block diagram that illustrates information transfer between a network controller and a serving mobile location center in an IP-based wireless telecommunications network.

FIG. 5 is a functional block diagram that illustrates the transfer of information between the SMLC and the NC. The positioning request is received at the NC. The NC serves as a particular target mobile subscriber. The SMLC obtains information related to the location of the mobile device from the NC.

The SMLC passes a base station subsystem application part-location extraction (BSSAP-LE) connection oriented information message to the NC. The NC contains an embedded BSSLAP-LE message. BSSLAP defines the SMLC-BSS layer 3 protocol. The BSSAP-LE message is transferred using an SCCP connection that was previously established between the SMLC and NC when the positioning request for the target MS was initially sent to the SMLC. The NC recognizes that it is the final destination due to the presence of the embedded BSSLAP message.

When the NC has positioning information for the target mobile subscriber to return the SMLC, the NC sends a BSSAP-LE connection oriented message to the SMLC containing an embedded BSSLAP message. The message is sent using the SCCP connection previously established for locating the target mobile device.

Figure 6:
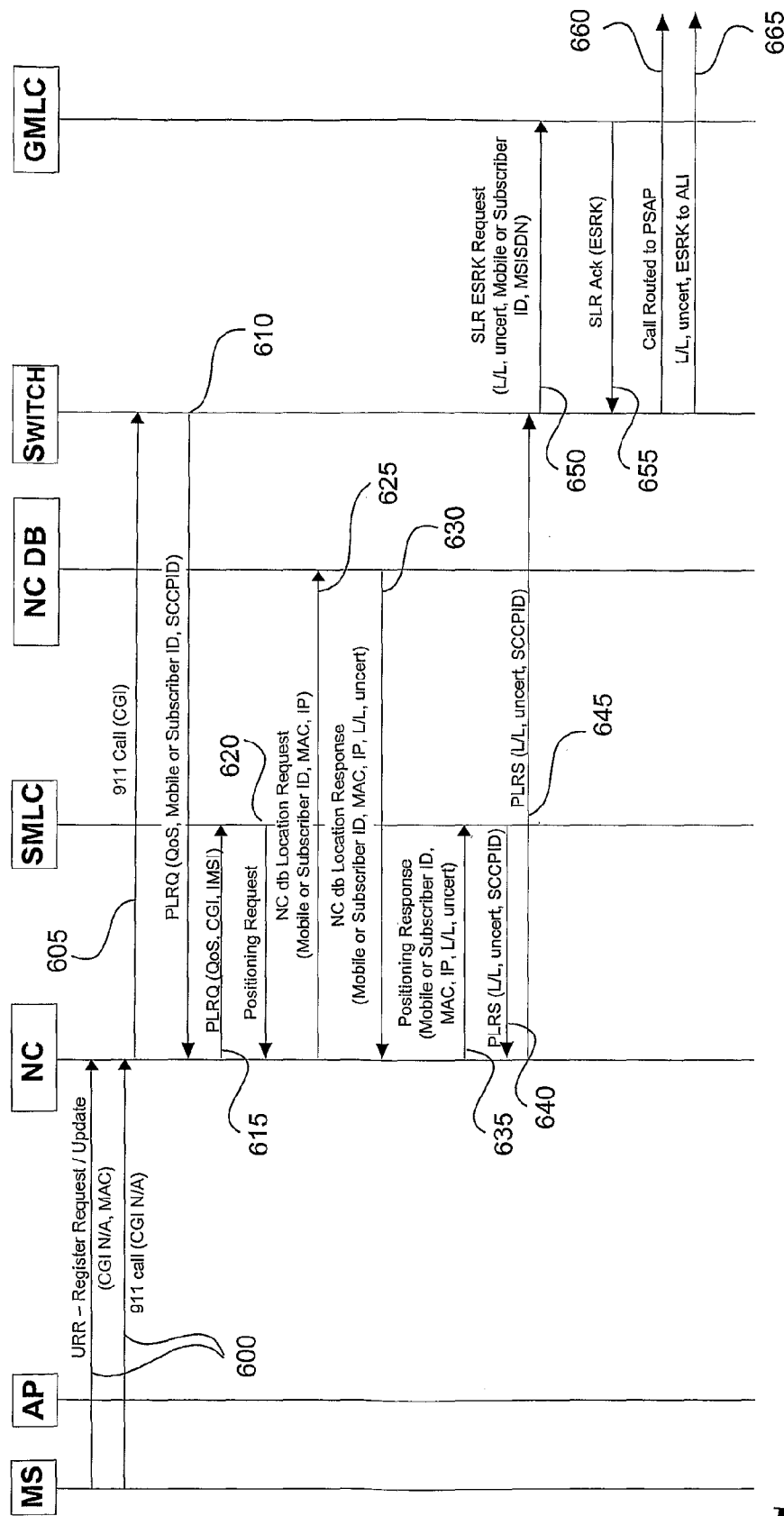
FIG. 6 is a state diagram that illustrates the transfer of information between system components when a 911 or "emergency" call is executed by a mobile device in an IP-based wireless telecommunications network.

FIG. 6 is a state flow diagram that illustrates the transfer of information between system components when a 911 or "emergency call" is executed from a mobile device over an IP-based wireless telecommunication network.

Step 600: The mobile subscriber (MS) registers for access as a wireless device using an IP-based telecommunications network. The registration process is initiated between the MS and the network controller (NC) via the access point (AP). The MS also identifies a wireless radio resource (e.g. a GSM CGI radio resource) and a corresponding MAC address during the registration request. The mobile subscriber dials 911, which is communicated to the NC.

Step 605: The NC forwards the 911 call to the switch for routing. The cell global identity (CGI) associated with the mobile subscriber (MS) are forwarded to the switch for further processing.

Step 610: The switch sends a PLRQ message to the NC based on the received 911 call. The PLRQ includes mobile subscriber information associated with quality of service (QoS), device or subscriber identifier, and an SCCP identifier. The device identifier is registered with the network when the mobile subscriber (MS) accesses the network.

Step 615: The NC forwards the PLRQ to the SMLC. The PLRQ includes QoS, CGI, and device or subscriber identifier information for the mobile device.

Step 620: The SMLC sends a positioning request message to the NC.

Step 625: The NC sends a location request message to the NC database. The location request message includes mobile subscriber information for the device identifier that is associated with the mobile device, a MAC address associated with the access point, and an IP address associated with the access point.

Step 630: The NC database provides one or more locations information to the NC in the form of a location response message, which may include the subscriber's address, access point location and public IP address serving area. The NC database may also provide an uncertainty rating that provides the likelihood that the identified location of the mobile subscriber is accurate.

Step 635: The NC sends a positioning response message to the SMLC, where the positioning response message includes all the locations information from the NC database to the SMLC. The SMLC executes an algorithm to calculate the location of the mobile device using the information received above to get the final latitudinal-longitudinal coordinates and the uncertainty rating.

Step 640: The SMLC returns the calculated location information to the NC via a PLRS message. The PLRS message includes the latitudinal-longitudinal coordinates, the uncertainty rating and the SCCP identifier.

Step 645: The NC forwards the PLRS message with the location information to the switch.

Step 650: The switch communicates an SLR ESRK Request message to the gateway mobile location center (GMLC), which requests a determination of PSAP information based on the location of the mobile device.

Step 655: The GMLC communicates an SLR Ack message, which returns PSAP information with an emergency service routing key (ESRK).

Step 660: The switch routes the call to the proper PSAP based on ESRK received from GMLC.

Step 665: The location of the mobile device is delivered to an application location interface (ALI) for the PSAP access.

Figure 7:
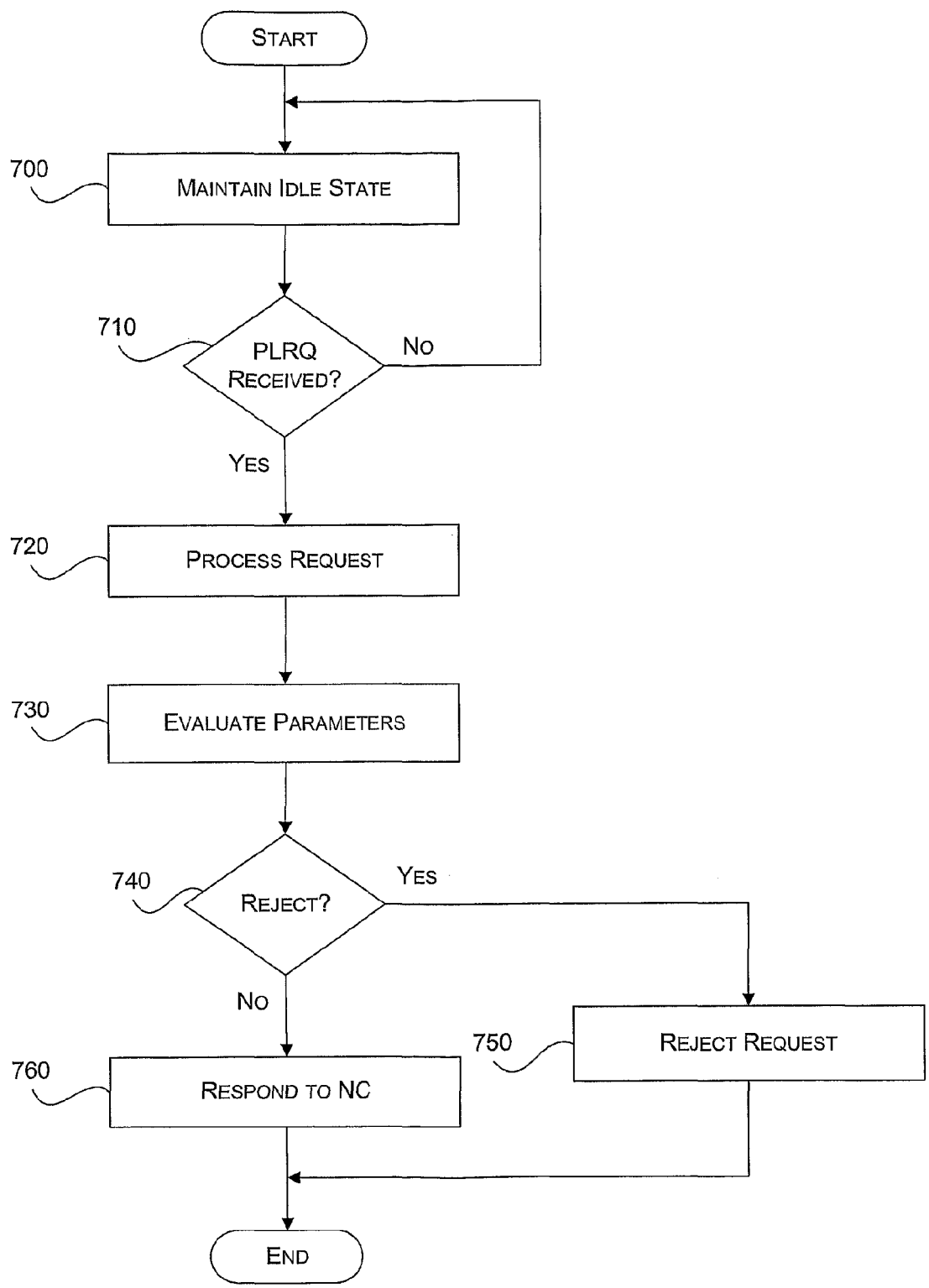
FIG. 7 is an operational flow diagram illustrating a process for determining a mobile device location from the perspective of a serving mobile location center in an IP-based wireless telecommunications network.

FIG. 7 is an operational flow diagram illustrating a process for determining a mobile device location from the perspective of the SMLC. The SMLC maintains an idle state at block 700.

Continuing to decision block 710, a determination is made whether a PLRQ message is received from the NC. If a PLRQ message is not received, processing continues at block 700 where the SMLC waits in an idle state for the PLRQ message. If a PLRQ message is received, processing continues at block 720.

The request is processed at block 720. The SMLC sends a positioning request message to the NC. The NC returns a positioning response message to the SMLC.

Moving to block 730 the parameters are evaluated. The SMLC executes an algorithm to calculate the location of the mobile device using at least one of: the subscriber's address based on the device or subscriber identifier; the access point (AP) location based on the MAC address associated with the access point; the serving area of the IP address associated with the access point; the uncertainty rating for each of the above locations, or any other combination thereof.

Advancing to decision block 740, a determination is made whether to reject the request. If the request is to be rejected, processing continues to block 750 where the request is rejected. Otherwise, processing proceeds to block 760 where the SMLC returns the location information to the NC via a PLRS message.

Figure 8:
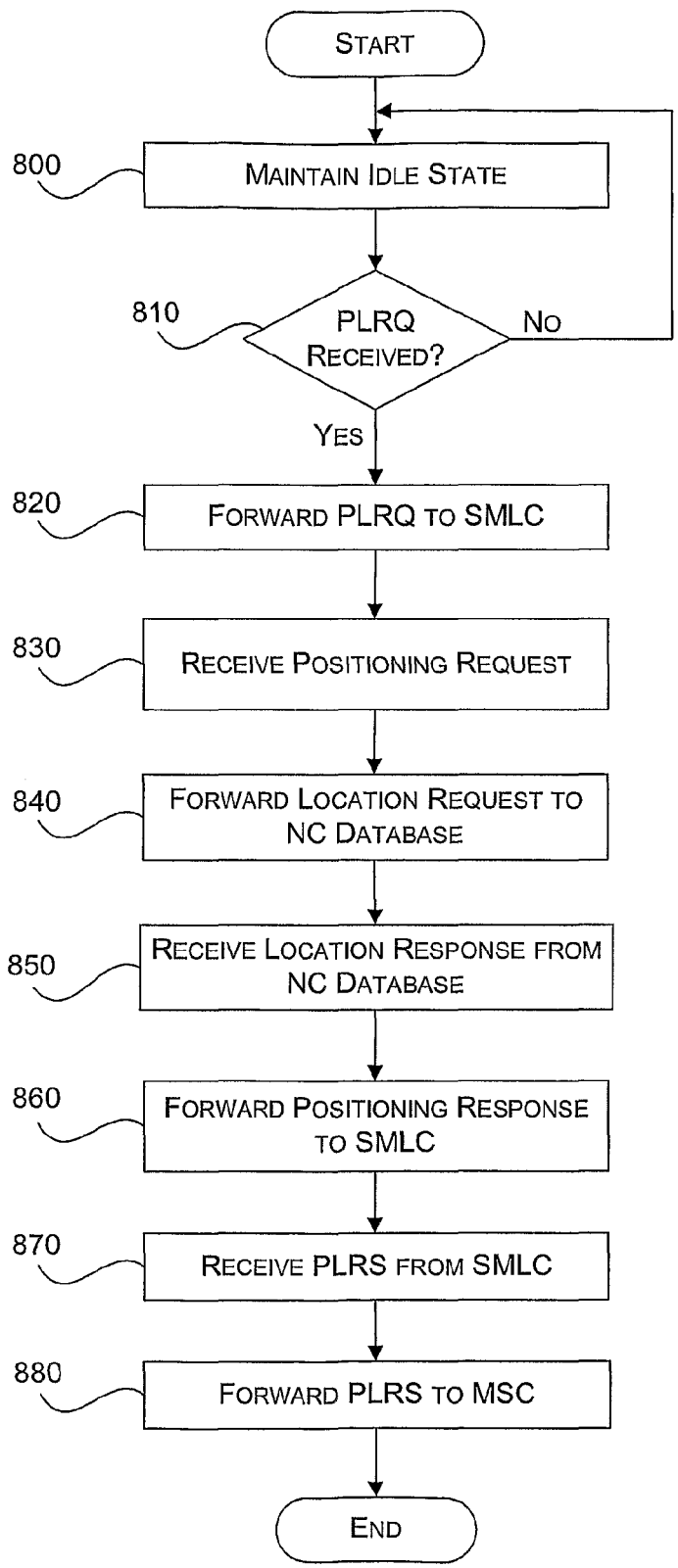
FIG. 8 is an operational flow diagram illustrating a process for determining a mobile device location from the perspective of a network controller in an IP-based wireless telecommunications network

FIG. 8 is an operational flow diagram illustrating a process for determining a mobile device location from the perspective of the NC. The NC maintains an idle state at block 800. Continuing to decision block 810, a determination is made whether a PLRQ message is received from the switch. If a PLRQ message is not received, processing continues at block 800 where the NC waits in an idle state for the PLRQ message. If a PLRQ message is received, processing continues at block 820.

The NC forwards the PLRQ message to the SMLC at block 820. Continuing to block 830, the NC receives a positioning request message from the SMLC. Advancing to block 840, the NC forwards a location request message to the NC database. Moving to block 850, the NC receives a location response message from the NC database. The location response message includes either: the subscriber's address based on the device identifier associated with the mobile device, the access point location based on the MAC address associated with the access point, the serving area of the IP address associated with the access point; or the uncertainty rating for each of the above locations.

Proceeding to block 860, the NC forwards a positioning response message to the SMLC. Transitioning to block 870, the NC receives a PLRS message from the SMLC. The PLRS message includes the location information for the mobile device (e.g., latitudinal-longitudinal information, uncertainty rating, and SCCPID). The NC forwards the PLRS message with the location information to the switch at block 880.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system for determining a location associated with a mobile device configured for voice communication over an Internet Protocol (IP)-based wireless telecommunications network, the system comprising:

a network controller with a processor and memory in an IP-based wireless telecommunications network that is configured to identify data associated with the mobile device, wherein the mobile device is communicably coupled to the network controller via an access point that operates on an unlicensed frequency spectrum and is coupled to an IP-based network, wherein the mobile device is configured for voice communication over the IP-based wireless telecommunications network via the access point, wherein the identified data includes at least one of an International Mobile Subscriber Identity (IMSI) or a media access control (MAC) address of the access point, and wherein the identified data is received by the network controller over the IP-based wireless telecommunications network; and a location database that is communicably coupled to the network controller, wherein the location database is configured for indexing with the identified data associated with the mobile device;

wherein the network controller is further configured to communicate a query to the location database that includes the identified data associated with the mobile device, wherein the location database is further configured to provide a response to the query, wherein the response includes location information associated with the mobile device, the location information including at least one of:
an address of the subscriber,
a location of the access point, or
a serving area of the access point, and wherein the response further includes an indication of a degree of accuracy of the location information.

2. The system of claim 1, further comprising a serving mobile location center that is communicably coupled to the network controller.

3. The system of claim 2, wherein the serving mobile location center is configured to communicate a positioning request message to the network controller, wherein the positioning request message includes a message type.

4. The system of claim 2, wherein the network controller is further configured to communicate a reset message to the serving mobile location center when a positioning request message from the serving mobile location center is invalidated, wherein the reset message identifies at least one of:
a message type,
a cell identifier,
a network controller control channel description,
a cause associated with the reset, or
a location area code.

5. The system of claim 2, wherein the network controller is further configured to communicate a reject message to the serving mobile location center when a positioning request message from the serving mobile location center is invalidated, wherein the reject message identifies at least one of:
a message type, or
a cause associated with the rejection.

6. The system of claim 2, wherein the network controller is further configured to communicate an abort message to the serving mobile location center, wherein the abort message identifies at least one of:
a message type, or
a cause associated with the abort.

7. The system of claim 1 wherein the identified data further includes at least one of a cell global identity (CGI) value, an IP address of the access point, and wherein the location database comprises values associated with at least one of:
- a location identifier associated with a known MAC address,
- a last known position associated with a device identifier for the mobile device based on the CGI value,
- a serving area of an IP address associated with the access point, or
- an uncertainty rating associated with each of the above locations.

8. The system of claim 1, wherein the location database is indexed according to at least one of:
- a device identifier,
- a MAC address of the access point, or
- an IP address of the access point.

9. The system of claim 1, wherein the network controller is further configured to communicate a location request message to the location database, wherein the location request message from the network controller identifies at least one of:
- a message type,
- an access point identifier associated with the mobile device, or
- a device identifier for the mobile device, and
- wherein the access point identifier comprises at least one of:
  - the MAC address of the access point, or
  - an IP address of the access point.

10. The system of claim 1, wherein the network controller is further configured to communicate a database abort message to the location database, wherein the database abort message identifies at least one of:
- a message type, or
- a cause associated with the database abort.

11. The system of claim 1, wherein the location database is further configured to provide a reply message in response to a location request from the network controller, wherein the reply message identifies at least one of:
- a message type,
- a location estimate,
- a latitude estimate,
- a longitude estimate,
- an uncertainty rating associated with the location estimate,
- a last known position associated with a device identifier for the mobile device,
- a cell global identity value, or
- an access point identifier, wherein the access point identifier comprises at least one of:
  - a MAC address of the access point or
  - an IP address of the access point.

12. The system of claim 1, wherein the location database is further configured to provide a database abort message, wherein the database abort message identifies at least one of:
- a message type or
- a cause associated with the database abort.

13. A network controller that is arranged in an IP-based wireless telecommunications network that includes facilities for a mobile device configured for voice communication over the IP-based wireless telecommunications network, the network controller comprising:
- a memory;
- a processor coupled to the memory;
- a component configured to receive a request for a location determination,
  - wherein the request for the location determination is associated with the mobile device, and
  - wherein the mobile device accesses the IP-based wireless telecommunications network for voice communication via an access point operating on unlicensed frequency spectrum and coupled to an IP-based network;
- a component configured to identify data associated with the mobile device,
  - wherein the identified data includes at least one of an International Mobile Subscriber Identity (IMSI) or a media access control (MAC) address of the access point, and
  - wherein the identified data is received by the network controller over the IP-based network;
- a component configured to communicate a location query to a location database,
  - wherein the location database is configured for indexing with the identified data associated with the mobile device; and
  - wherein the location query includes the identified data associated with the mobile device;
- a component configured to receive a location response from the location database, the location response includes location information for the mobile device, including at least one of:
  - an address of the subscriber,
  - a location of the access point, or
  - a serving area of the access point,
  - wherein the response further includes an indication of a degree of accuracy of the location information;
- a component configured to process the location response from the location database to provide a positioning response; and
- a component configured to send a reply to the request for the location determination with the positioning response.

14. The network controller of claim 13, wherein the request for the location determination is identified with the mobile device according to at least one of:
- a device identifier,
- a cell global identity (cell global identity) value, or
- an access point identifier, wherein the access point identifier comprises at least one of
  - a media access control (MAC) address of the access point or
  - an internet protocol (IP) address of the access point.

15. The network controller of claim 13, wherein the location query to the location database identifies at least one of:
- a device identifier,
- a cell global identity value, or
- an access point identifier, wherein the access point identifier comprises at least one of:
  - a MAC address of the access point or
  - an IP address of the access point.

16. The network controller of claim 13, wherein the location response from the location database identifies at least one of:
- a message type,
- a location estimate,
- a latitude estimate,
- a longitude estimate,
- an uncertainty rating associated with the location estimate,
- a last known position associated with a device identifier,
- a cell global identity value, or
- an access point identifier, wherein the access point identifier comprises at least one of:
  - a MAC address of the access point or
  - an IP address of the access point.

17. A method for determining a location associated with a mobile device in an IP-based wireless telecommunication network, the method comprising:
   identifying data associated with the mobile device,
      wherein the mobile device is communicably coupled to an IP-based wireless telecommunications network via an access point that operates on an unlicensed frequency spectrum and is communicably coupled to an IP-based network,
      wherein the mobile device is configured for voice communication over the IP-based wireless telecommunications network via the access point, and
      wherein the identified data includes at least one of an International Mobile Subscriber Identity (IMSI) or a media access control (MAC) address of the access point;
   transmitting a query over the IP-based network to a location database that includes the identified data associated with the mobile device,
      wherein the location database is configured for indexing with the identified data associated with the mobile device; and
   transmitting a reply to the query, wherein the reply includes location information associated with the mobile device, the location information including at least one of:
      an address of the subscriber,
      a location of the access point, or
      a serving area of the access point,
      wherein the reply further includes an indication of a degree of accuracy of the location information.

18. The method of claim 17, further comprising receiving a positioning request message, wherein the positioning request message includes a message type.

19. The method of claim 17, further comprising communicating a positioning response message, wherein the positioning response message identifies at least one of: a message type, a network controller control channel description, a device identifier, a location estimate, a latitude estimate, a longitude estimate, an uncertainty rating associated with the location estimate, a last known position associated with a device identifier, a cell global identity value, or an access point identifier, wherein the access point identifier comprises at least one of: a media access control (MAC) address or an internet protocol (IP) address associated with the access point.

20. The method of claim 17, further comprising communicating a reset message when a positioning request message is invalidated, wherein the reset message identifies at least one of: a message type, a cell identifier, a network controller control channel description, a cause associated with the rejection, or a location area code.

21. The method of claim 17, further comprising communicating a reject message when a positioning request message is invalidated, wherein the reject message identifies at least one of: a message type, or a cause associated with the rejection.

22. The method of claim 17, further comprising communicating an abort message, wherein the abort message identifies at least one of: a message type, or a cause associated with the abort.

23. The method of claim 17, wherein the location database comprises values associated with at least one of a location identifier associated with a known MAC address, a last known position associated with a device identifier, a serving area of an IP address associated with the access point, or an uncertainty rating associated with each of the above locations.

24. The method of claim 17, further comprising indexing the location database according to at least one of: a device identifier, a MAC address associated with an access point in the system, or an IP address associated with the access point.

25. The method of claim 17, further comprising communicating a location request to the location database, wherein the location request message identifies at least one of: a message type, an access point identifier associated with the mobile device, or a device identifier, wherein the access point identifier comprises at least one of: a MAC address or an IP address associated with the access point.

26. The method of claim 17, further comprising communicating a database abort message to the location database, wherein the database abort message identifies at least one of: a message type, or a cause associated with the database abort.

27. The method of claim 17, further comprising communicating a reply message from the location database in response to a location request, wherein the reply message identifies at least one of a message type, a location estimate, a latitude estimate, a longitude estimate, an uncertainty rating associated with the location estimate, a last known position associated with a device identifier, a cell global identity value, or an access point identifier, wherein the access point identifier comprises at least one of: a MAC address or an IP address associated with the access point.

28. A method in a network controller of determining a location of a dual-mode mobile device configured for voice communication over a cellular network and for voice communication over an Internet Protocol (IP)-based wireless telecommunication network, the method comprising:
   determining that the dual-mode mobile device is registered for voice communication over the IP-based wireless telecommunication network through a wireless access point that operates on an unlicensed frequency spectrum and is communicably coupled to an IP network;
   receiving identifying data over the IP-based network associated with at least one of the dual-mode device and the wireless access point, wherein the identifying data includes at least one of—
      a media access control (MAC) address of the wireless access point,
      an International Mobile Subscriber Identity (IMSI),
      a cell global identity value of a cell of the cellular network, wherein the cell is associated with the dual-mode mobile device at the time of the voice communication over the IP-based wireless telecommunication network, or
      an IP address of the wireless access point;
   based on the identifying data, determining location information usable to determine a location of the mobile device, wherein the location information includes at least one of—
      a location of the wireless access point,
      a location of the subscriber of the dual-mode device,
      a location of the cell associated with the dual-mode mobile device at the time of the voice communication over the IP-based wireless telecommunication network, or
      a location of a public IP address serving area;
   determining a degree of accuracy of the location information; and based on the location information, determining a location of the dual-mode mobile device and providing the location in conjunction with the degree of accuracy.

29. The method of claim 28, further comprising based on the identifying data, determining an uncertainty rating that provides a likelihood that the location information is accurate.

30. The method of claim 28 wherein the location associated with the dual-mode mobile device includes longitudinal and latitudinal coordinates, and wherein the method further comprises:

based on the longitudinal and latitudinal coordinates, determining a public safety access point (PSAP); and routing the voice communication to the PSAP.

31. The method of claim 28, further comprising based on the location associated with the dual-mode mobile device, providing at least one location-based service to the dual-mode device.

* * * * *